Oct. 29, 1957     A. A. BAKER ET AL     2,810,918

WIPING FERRULE

Filed Dec. 21, 1953

INVENTOR.
Albert A. Baker
BY Harry L. Rhoades

Charles L. Lovercheck
Attorney

United States Patent Office 2,810,918
Patented Oct. 29, 1957

2,810,918

WIPING FERRULE

Albert A. Baker and Harry L. Rhoades, Jr., Erie, Pa., assignors to Zurn Industries, Inc., Erie, Pa., a corporation of Pennsylvania Application December 21, 1953, Serial No. 399,324

1 Claim. (Cl. 4—252)

This invention relates to plumbing fittings and more particularly to means for adapting wall closet fittings of lead pipe for use between the closet and the wall fitting.

In wall fittings made according to previous designs and with which we are familiar, a threaded nose piece was attached to the water closet fitting and a ferrule having female threads thereon engaged the nose piece. A separate collar was threaded on the ferrule and a gasket of lead or other suitable material was compressed between one face of the packing nut and the end of the nose piece. Some plumbing codes require that all joints depend upon lead connections for prevention of leakage rather than on threaded connections.

We have discovered that leakage can be prevented in installations of this type by making an integral collar on the wiping ferrule instead of the usual threaded packing nut and by sloping the collar inwardly on the face thereof adjacent the end of the nose piece. By so doing, the gasket will be squeezed down into engagement with the threads of the ferrule as well as sealingly engaging the end of the collar and the end of the nose piece, thereby providing a water tight joint and a threaded connection is not depended upon to prevent leakage.

In carrying out our invention, an object thereof is to provide a wiping ferrule for a plumbing connection wherein an integral collar is provided on the wiping ferrule.

Another object of our invention is to provide a novel type of joint in a plumbing connection wherein no threaded connection is relied upon to prevent leakage.

Another object of our invention is to provide a plumbing connection with a wiping ferrule having a integral collar thereon wherein one face of the collar slopes inwardly to force a packing into engagement with the threads of the collar.

Another object of our invention is to provide a wiping ferrule for a plumbing connection which is simple in construction, economical in manufacture, and efficient in use.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figure 1:
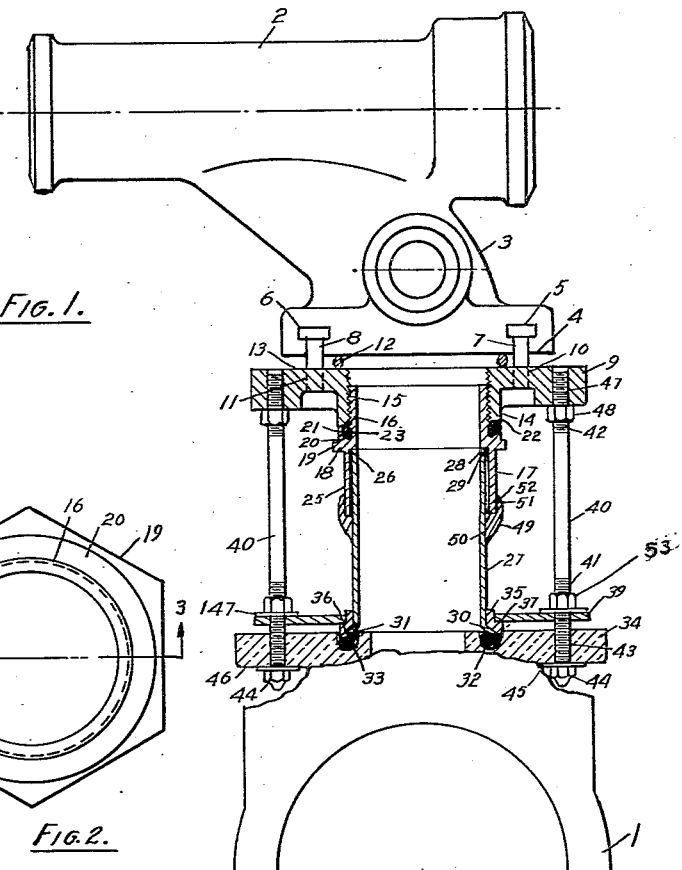
Fig. 1 is a top view partially in cross section showing our novel invention.
Figure 2:
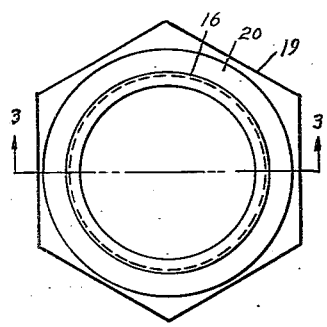
Fig. 2 is a top view of the wiping ferrule.
Figure 3:
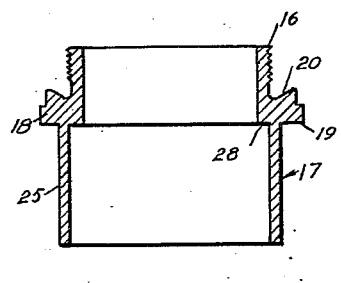
Fig. 3 is a cross sectional view taken on line 3—3 of Fig. 2.

Now with more specific reference to the drawing, we show a water closet 1 adapted to be attached to a drain line 2, the drain line 2 having a branch 3 adapted to be housed in a wall. The branch 3 has a face surface 4 having openings 5 and 6 therein to receive the bolts 7 and 8. The bolts 7 and 8 extend through the face plate 9 at 10 and 11 and are provided with nuts on the end to hold the face plate 9 in engagement with the lead gasket 12 which is compressed between the face 4 of the branch 3 and the face 13 of the face plate 9. The face plate 9 has the nose 14 integral therewith which is internally threaded at 15 to receive the male threaded portion 16 of a wiping ferrule 17.

The wiping ferrule 17 has an integral collar 18 attached thereto with the wrench engaging portion 19 on the outer periphery thereof. The face 20 of the collar 18 slopes outward and toward the nose 14 to form a beveled surface which engages the packing 21 to compress the packing between the tapered surface 20 of the collar 18 and the tapered surface 22 of the nose 14. It will, therefore, be apparent that when a wrench engages the member 19 to tighten the male threaded portion 16 of the ferrule 17 into the female threads 15 of the nose 14, the packing 21 will be forced against the tapered surface 22 and the tapered surface 20 and thereby forced down into engagement with the male threads 16 at 23, thereby forming a sealed connection between the wiping ferrule 17, the nose 14, and the collar 18. It will, therefore, be apparent that even though liquid can find its way between the male ferrule threads and the female threads on the nose, it cannot flow around the packing 21.

The cylindrical wiping portion 25 is integral with the ferrule 17 at 26 and extends outward to telescopically engage a section of lead pipe 27. An internal shoulder 28 is provided on the wiping ferrule 17 which engages the ends 29 of the lead pipe 27. The end of the lead pipe 27 is flared at 30 to form the outwardly extending flared end portion 31 which engages a gasket 32 embedded in the groove 33 in the plate 34 which is integral with the water closet. A washer 35 is disposed around the pipe 27 and has a tapered surface 36 which engages the flared portion 31 of the lead pipe 27. A ledge 37 is provided on the collar 18 which interfits with the collar 39.

The fixture bolts 40 are threaded at an intermediate point 41 and at the other end 42 thereof. The fixture bolts 40 extend through the holes 43 in the plate 34 and have the acorn nuts 44 on one end thereof which engage the washer 45 and washer 45 engages the surface 46 of the plate 34. The nuts 53 threadably engage the threads 41 and the washers 147 are disposed on the bolts 40 to engage the collar 39. The nuts 53 are tightened against the washers 147 to force the collar 39 toward the member 46, thereby compressing the gasket 32 and the flared portion 31 against the plate 34 to form a sealed liquid tight connection.

The fixture bolts 40 engage the threaded holes 47 in the member 9 and the lock nuts 48 are provided to lock the fixture bolts 40 against loosening. The fixture bolts 40 may be tightened until the end 29 of the lead pipe 27 firmly engages the shoulder 28. The lead wiped joint 49 is then applied to the lead pipe 27 at 50 and the material thereof extends up over the end 51 of the ferrule 17 at 52 to form a wiped liquid tight joint therebetween.

From the foregoing, it will be apparent that we have provided a novel type of wiping ferrule for mounting wall closets which eliminates the dependence on old threaded joints for a liquid field.

Further, we have set forth the invention in its preferred practical forms but we are aware that the structure shown is capable of modification within a range of equivalents without departing from the invention which is to be understood is broadly novel as is commensurate with the appended claim.

The embodiments of the invention in which an exclusive property or privilege is claimed are defined as follows:

A water closet and mounting means therefor comprising a drain pipe having a hollow branch with an opening, a flat face on said branch, said flat face on said branch surrounding said opening, a plate member having an opening in registration with the opening in said branch, a sealing member disposed between said flat face of said branch and said plate member and extending around said opening, means connecting said branch and said plate member together, means compressing said sealing member between said plate member and said branch, said plate member having a cylindrical nose member extending from said plate member, said nose member being internally threaded, an externally threaded wiping ferrule threadably engaging said nose member, said wiping ferrule having a circumferentially disposed collar formed integral therewith, a packing member disposed between said collar and the end of said nose member, the adjacent surface of said collar to said nose member sloping inwardly and away from said collar whereby when said ferrule is tightened into said nose member, said packing member is forced into sealing engagement with said threads on said ferrule, a lead pipe telescopically engaging said ferrule, an internal circumferential shoulder on said ferrule engaging one end of said lead pipe, a wiped lead seal between said lead pipe and an end of said ferrule, said lead pipe sealingly engaging a water closet, said wiping ferrule and said lead pipe comprising lead sealed joints between said branch and said water closet, the end of said lead pipe engaging said water closet being flared, a gasket disposed between said flared end and said closet, a washer having a tapered inside edge being disposed around said pipe in engagement with said tapered edge of said lead pipe, said washer having a peripheral ledge engaged by a collar for holding said lead pipe in sealing engagement with said gasket, and fixture bolts attached to said plate member and said water closet urging said lead pipe, ferrule, plate member, and gasket into sealing relation.

References Cited in the file of this patent

UNITED STATES PATENTS

| | | |
|---|---|---|
| 748,418 | Renton | Dec. 29, 1903 |
| 1,040,823 | Watrous | Oct. 8, 1912 |
| 1,041,905 | Tong | Oct. 22, 1912 |
| 1,067,533 | Mann | July 15, 1913 |
| 1,099,066 | Lillie | June 2, 1914 |
| 1,335,056 | Hinsdale | Mar. 30, 1920 |
| 1,497,171 | Haas | June 10, 1924 |
| 1,545,839 | Mason | July 14, 1925 |
| 1,709,132 | Hinsdale | Apr. 16, 1929 |
| 1,901,897 | Clayton | Mar. 21, 1933 |
| 2,083,091 | Rector | June 8, 1937 |
| 2,096,240 | Groeniger | Oct. 19, 1937 |
| 2,147,254 | Hinderliter | Feb. 14, 1939 |
| 2,208,199 | Sisk | July 16, 1940 |
| 2,666,211 | Schmid | Jan. 19, 1954 |

FOREIGN PATENTS

| | | |
|---|---|---|
| 988,194 | France | Apr. 25, 1951 |